(12) United States Patent
Gorisse

(10) Patent No.: US 8,598,945 B2
(45) Date of Patent: Dec. 3, 2013

(54) HIGH VOLTAGE CHARGE-PUMP WITH A FEEDBACK CONTROL LOOP

(75) Inventor: Philippe Gorisse, Midi-Pyrenees (FR)

(73) Assignee: RF Micro Devices, Inc., Greensboro, NC (US)

( * ) Notice: Subject to any disclaimer, the term of this patent is extended or adjusted under 35 U.S.C. 154(b) by 69 days.

(21) Appl. No.: 13/116,386

(22) Filed: May 26, 2011

(65) Prior Publication Data

US 2011/0309877 A1 Dec. 22, 2011

Related U.S. Application Data

(60) Provisional application No. 61/356,881, filed on Jun. 21, 2010.

(51) Int. Cl.
- *G05F 1/575* (2006.01)
- *H02M 3/07* (2006.01)
- *H03L 7/24* (2006.01)

(52) U.S. Cl.
USPC .............................. 327/536; 363/59

(58) Field of Classification Search
None
See application file for complete search history.

(56) References Cited

U.S. PATENT DOCUMENTS

| | | | | |
|---|---|---|---|---|
| 4,236,199 A | * | 11/1980 | Stewart | 363/60 |
| 5,280,420 A | * | 1/1994 | Rapp | 363/60 |
| 6,486,728 B2 | * | 11/2002 | Kleveland | 327/536 |
| 6,756,838 B1 | * | 6/2004 | Wu et al. | 327/536 |
| 6,791,212 B2 | * | 9/2004 | Pulvirenti et al. | 307/113 |
| 7,253,676 B2 | * | 8/2007 | Fukuda et al. | 327/536 |
| 7,256,640 B2 | | 8/2007 | Ucciardello et al. | |
| 7,307,385 B2 | | 12/2007 | Yamamoto et al. | |
| 7,391,873 B2 | * | 6/2008 | Deruginsky et al. | 381/113 |
| 7,928,796 B2 | * | 4/2011 | Namekawa | 327/537 |

OTHER PUBLICATIONS

Dickson, J.F., "On-chip high voltage generation in NMOS integrated circuits using an improved voltage multiplier technique," IEEE Journal of Solid State Circuits, Jun. 1976, pp. 374-378, vol. 11, No. 3, IEEE.

Wing-Hung et al., "Charge Redistribution Loss Consideration in Optimal Charge Pump Design", IEEE International Symposium on Circuits and Systems, May 23-26, 2005, pp. 1895-1898, vol. 2, IEEE.

\* cited by examiner

*Primary Examiner* — Lincoln Donovan
*Assistant Examiner* — Terry L Englund
(74) *Attorney, Agent, or Firm* — Withrow & Terranova, P.L.L.C.

(57) ABSTRACT

A high voltage charge-pump includes a plurality of voltage boosting stages, a low voltage input, and at least one clock input. A sensing charge-pump having a voltage detector output has at least one voltage sensing stage that is communicably coupled to at least one of the plurality of voltage boosting stages. A loop filter in a feedback control loop includes a voltage detector input coupled to the voltage detector output, a voltage reference input, and a voltage error output. A voltage controlled oscillator (VCO) with a variable frequency output has a voltage error input coupled to the voltage error output. The feedback control loop also includes at least one driver having a variable frequency input coupled to the variable frequency output and at least one clock output coupled to the at least one clock input.

20 Claims, 11 Drawing Sheets

| TEMP(°C) | ILOAD(A) | Vdd(V) | alpha* | $V_{OUT}$(V) |
|---|---|---|---|---|
| 27 | 1μ | 10 | 0.01 | 124 |
| 27 | 100n | 10 | 0.01 | 127 |
| -40 | 1μ | 10 | 0.01 | 124 |
| 90 | 1μ | 10 | 0.01 | 125 |
| 27 | 1μ | 10 | 0.05 | 125 |
| 27 | 1μ | 9.8 | 0.01 | 123 |
| 27 | 1μ | 10.5 | 0.01 | 128 |

*FIG. 6*

| SAMPLE | v100(V) | v95(V) | $V_{BG}(V)$ |
|---|---|---|---|
| 1 | 104 | 99 | 1.19 |
| 2 | 104 | 99 | 1.21 |
| 3 | 104 | 100 | 1.12 |
| 4 | 102 | 97 | 1.12 |
| 5 | 104 | 100 | 1.20 |
| 6 | 104 | 100 | 1.20 |

HIGH VOLTAGE CHARGE-PUMP WITH A FEEDBACK CONTROL LOOP

RELATED APPLICATION

This application claims the benefit of provisional patent application Ser. No. 61/356,881, filed Jun. 21, 2010, the disclosure of which is hereby incorporated herein by reference in its entirety.

FIELD OF THE DISCLOSURE

Embodiments of the present disclosure relate to charge-pumps having feedback control loops, and in particular to high voltage charge-pumps that are usable to drive switches that require a high voltage for activation.

BACKGROUND

Micro-electro-mechanical systems (MEMS) switches used in wireless communication devices such as mobile terminals require a gate voltage of about 100V to activate. A high voltage charge-pump includes a high voltage output that can provide an output voltage in a range of 80V to 150V. The output voltage is required to stay within a specified voltage range due to voltage tolerances of various devices connected to the high voltage output. For example, the output voltage should not exceed a specified maximum voltage of a device such as a transistor and a high voltage level shifter, yet the output voltage should exceed the MEMS threshold voltage needed to provide a low resistive radio frequency (RF) switch contact.

FIG. 1 is a block diagram of a prior art feedback loop controlled high voltage charge-pump 10 that is usable to maintain an output voltage within a specified voltage range. A charge-pump section 12 boosts a source voltage $V_{dd}$ to a higher level. In operation, the output voltage is detected by a resistive divider load 14 that provides a divided voltage $V_{DIV}$. The divided voltage $V_{DIV}$ is compared to a reference band gap voltage $V_{BG}$. In response, an integrator 16 outputs an error signal $V_{TUNE}$ that controls a voltage controlled oscillator (VCO) 18. A signal $F_{OSC}$ output from the VCO 18 proportionally controls the output voltage level of the charge-pump 10. When the output voltage of the charge-pump 10 drops below a specified voltage range set by the reference band gap voltage $V_{BG}$, the frequency of the signal $F_{OSC}$ is increased by the VCO 18 to raise the output voltage of the charge-pump 10 such that the output voltage rises back within the set voltage range. Alternately, when the output voltage of the charge-pump 10 rises above the specified voltage range, the frequency of the signal $F_{OSC}$ is decreased by the VCO 18 such that the output voltage of the charge-pump 10 falls back within the set voltage range.

FIG. 2 depicts a circuit diagram of a prior art Dickson charge-pump 20 that is usable as the charge-pump section 12. The Dickson charge-pump 20 comprises N stages made up of capacitors $C_1$ through $C_N$ and diodes $D_1$ through $D_{N+1}$. For example, a first stage is made up of the diode $D_1$ having an anode coupled to the input voltage $V_{dd}$, and a cathode coupled to an anode of the diode $D_2$. The capacitor $C_1$ has a first end coupled to both the cathode of the diode $D_1$ and the anode of the diode $D_2$. The capacitor $C_1$ has a second end that is driven by a first clock signal $\varnothing$. A second stage is made up of the diode $D_2$ having a cathode coupled to an anode of the diode $D_3$. The capacitor $C_2$ has a first end coupled to both the cathode of the diode $D_2$ and the anode of the diode $D_3$. The capacitor $C_2$ has a second end that is driven by a second clock signal $\overline{\varnothing}$, which is inverted with respect to the first clock signal $\varnothing$. For subsequent stages, the odd numbered capacitors such as the capacitor $C_3$ are driven by the first clock signal $\varnothing$, while the even numbered capacitors such as the capacitor $C_4$ are driven by the second clock signal $\overline{\varnothing}$. A first end of a filter capacitor $C_{OUT}$ is coupled to the cathode of the diode $D_{N+1}$. A second end of the filter capacitor $C_{OUT}$ is coupled to a fixed voltage node such as ground. A load represented by a resistor $R_{LOAD}$ is coupled in parallel with the filter capacitor $C_{OUT}$.

FIG. 3 is a generalized block diagram of a prior art feedback loop controlled high voltage charge-pump 22. In this case, a detector 24 can be the resistive divider load 14 (FIG. 1). The detector 24 samples the output voltage $V_{out}$ provided by the charge pump 22 and outputs a detector voltage $V_{DET}$ that is received by an integrator loop filter 26. A band gap reference voltage $V_{BG}$ input into the integrator loop filter 26 outputs an error signal $V_{ERR}$ that is proportional to the difference between the detector voltage $V_{DET}$ and the band gap reference voltage $V_{BG}$. A VCO 28 receives the error signal $V_{VERR}$, and in response outputs a variable frequency signal $F_{OSC}$ that is received by drivers 30 that output at least one clock signal CK that controls the level of the output voltage $V_{OUT}$. In operation, the at least one clock signal CK increases in frequency when the output voltage $V_{OUT}$ drops below a desired level that is set by the band gap reference voltage $V_{BG}$. A main charge-pump section 32 may be made up of the prior art Dickson charge-pump 20 (FIG. 2). The main charge pump section 32 boosts an input voltage $V_{dd}$ to the voltage $V_{OUT}$.

In an application wherein the prior art feedback loop controlled high voltage charge-pump 22 is used to activate a MEMS switch, a resistive load is practically nonexistent, drawing only about 100 nA depending on MEMS switching frequency. Therefore, any significant current drawn from the output of the main charge-pump section 32 is drawn by the detector 24. Even when providing a resistance of 50 MΩ for the detector 24, the amount of current drawn from the output of the main charge pump section 32 is on the order of 2 µA. Accounting for an efficiency of around 50%, a current drawn from a 2.7V source for $V_{dd}$ will amount to about 150 uA, which is a significant energy drain for a battery operated device such as a mobile terminal.

Increasing the resistance of the detector 24 above 50 MΩ is not a solution to this current drain problem, because a 50 MΩ resistor takes up around 0.2 mm², which is a relatively large integrated circuit (IC) die area. Also problematic is a relatively large parasitic capacitance that is associated with such a large resistor. The problems brought about by the relatively large capacitance are that the relatively large capacitance may limit the loop bandwidth and stability of the feedback loop controlled high voltage charge-pump 22. Increasing the complexity (i.e., the order) of the feedback may reduce the problems of loop bandwidth and stability, but increasing the complexity of the feedback would not improve the current drain problem or the problem of increased die size. Thus, there is a need for a circuit that reduces the relatively high current drain, while also reducing the amount of die area taken up by detector components used in the feedback loop of a high voltage charge-pump.

SUMMARY

The present disclosure provides a circuit that reduces the relatively high current drain, while also reducing the amount of die area taken up by detector components used in the feedback loop of a high voltage charge-pump. Moreover, the circuit of the present disclosure eliminates the need for a high voltage transistor that when turned off blocks a current discharge through the resistor divider of prior art charge-pumps having feedback control loops. In general, the circuit of the present disclosure is a high voltage charge-pump with a novel feedback control loop.

In particular, the circuit of the present disclosure includes a high voltage charge-pump section having a low voltage input, at least one clock input and a high voltage output. A Dickson charge-pump is usable as the high voltage charge-pump section. As such, the high voltage charge-pump section includes a plurality of voltage boosting stages. However, in accordance with the present disclosure, the Dickson charge-pump is adapted to accommodate a sensing charge-pump that includes a voltage sensing output. The sensing charge-pump has at least one voltage sensing stage that is communicably coupled to at least one of the plurality of voltage boosting stages.

The circuit further includes a loop filter having a voltage detector input coupled to the voltage detector output, a voltage reference input, and a voltage error output. Also included is a voltage controlled oscillator (VCO) having a voltage error input coupled to the voltage error output and a variable frequency output. At least one driver having a variable frequency input is coupled to the variable frequency output. The at least one driver includes at least one clock output that is coupled to the at least one clock input of the high voltage charge-pump section.

The sensing charge pump replaces the function of a resistive divider that is used as a detector in prior art high voltage charge-pump circuits that include a feedback control loop. As a result, the circuit of the present disclosure is a high voltage charge-pump with a novel feedback control loop that reduces the relatively high current drain, while also reducing the amount of die area taken up by detector components used in the feedback loop of the high voltage charge-pump. Another advantage of the circuit of the present disclosure is that when the at least one clock signal is stopped, the output voltage provided by the high voltage charge pump section will remain at a high level for a relatively long time before needing to be refreshed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is a table that provides testing results of the output voltage $V_{OUT}$ for the feedback loop controlled high voltage charge-pump of FIG. 4.

FIG. 10 is a table that provides sample output voltage repeatability measurements over several samples.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 3:
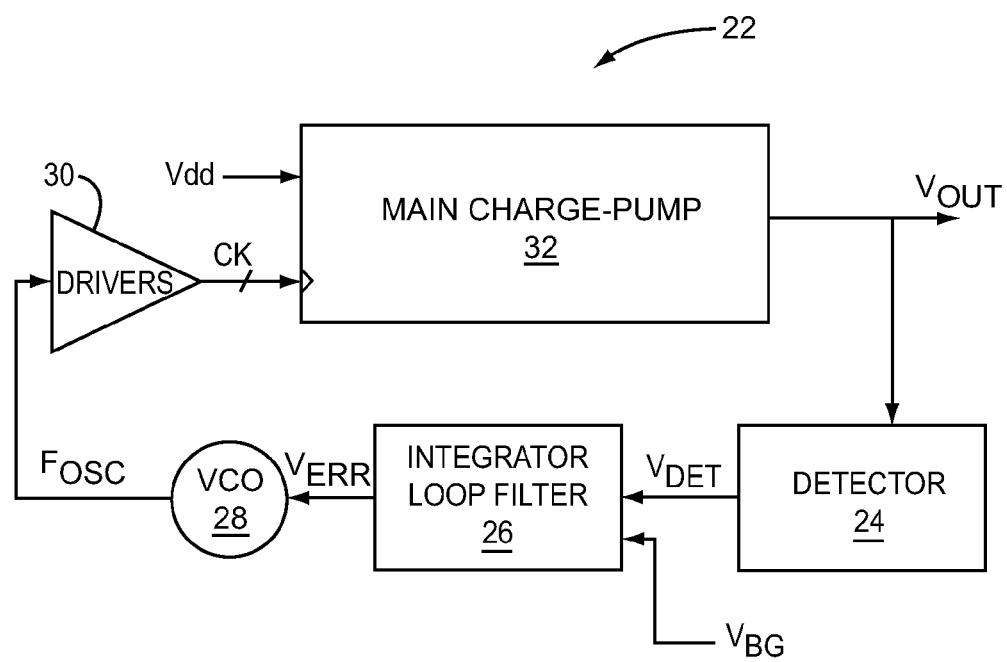
FIG. 3 is a generalized block diagram of a prior art feedback loop controlled high voltage charge-pump.
Figure 4:
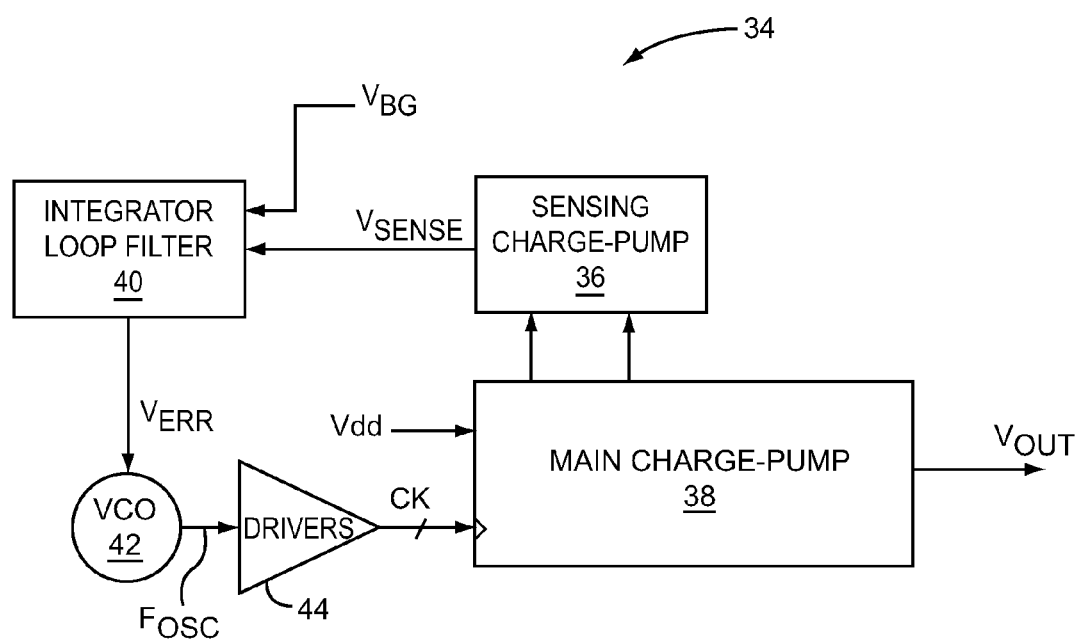
FIG. 4 is a block diagram of a feedback loop controlled high voltage charge-pump that is in accordance with the present disclosure.

FIG. 4 is a block diagram of a charge-pump 34 that in accordance with the present disclosure provides a high output voltage. For the purpose of this disclosure, a high output voltage level ranges between about 50V and 150V, and a low input voltage level ranges between about 1V and 25V. For example, in one embodiment of the present disclosure, a low input voltage level of between about 2.0V and about 3.5V yields a high output voltage level of around 105V. The level of the high voltage output is controlled by a feedback loop that includes a sensing charge pump 36 that samples a voltage level of a relatively low voltage stage of a main charge-pump section 38 that replaces the detector 24 (FIG. 3) of the prior art. The sensing charge-pump 36 outputs a sensing voltage $V_{SENSE}$, which is received by an integrator type feedback loop filter 40 that compares the sensing voltage $v_{SENSE}$ with a band gap reference voltage $V_{BG}$, and in response outputs an error voltage $V_{ERR}$ that drives a VCO 42. A variable frequency signal $F_{OSC}$ has a frequency that changes in proportion to the level of the error voltage $V_{ERR}$. The feedback loop also includes drivers 44 that receive the variable frequency signal $F_{OSC}$, and in response generate at least one clock signal CK that controls the level of the output voltage $V_{OUT}$ provided by the main charge-pump section 38. In operation, the at least one clock signal CK increases in frequency when the output voltage $V_{out}$ drops below a desired level that is set by the band gap reference voltage $V_{BG}$. In contrast, the at least one clock signal CK decreases in frequency when the output voltage $V_{OUT}$ rises above the desired level set by the band gap reference voltage $V_{BG}$.

Figure 5:
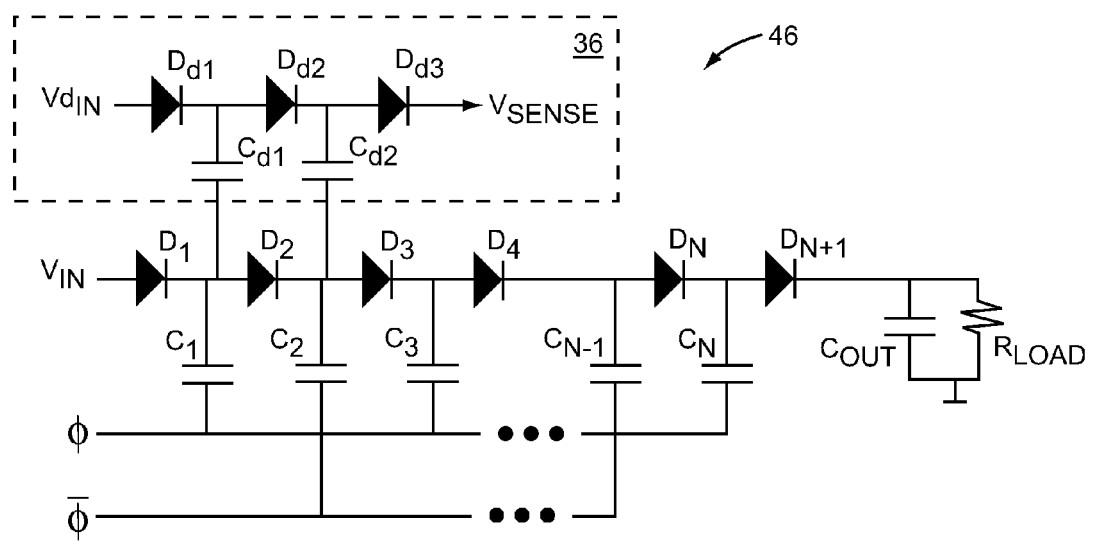
FIG. 5 is a circuit diagram of a Dickson charge-pump that is usable as the main charge pump section of FIG. 4.

FIG. 5 is a circuit diagram of a Dickson charge-pump 46 that is adapted to accommodate the sensing charge-pump 36 in accordance with the present disclosure. The Dickson charge-pump 46 is usable as the main charge pump section 38. The output voltage of the Dickson charge-pump 46 is given by:

$$Vout=Vin-V_d+N(V_\phi-V_d-V_L) \qquad (1)$$

Where $V_{IN}$ is the input supply voltage, $V_d$ is the diode voltage, $V_\phi$ is the clock amplitude, N is the number of stages and $V_L$ is the voltage loss due to the current load. The same equation is used to calculate the sensing output voltage:

$$V_{SENSE} = Vd_{in} - V_d + R(V_{d\phi} - V_d - V_{dL}) \quad (2)$$

Where $V_{d\phi}$, is the clock amplitude and R is the number of stages in the sensing circuit. Note that $V_{d\phi}$, is derived from the main charge-pump section 38 and is expressed by:

$$V_{d\phi} = V_\phi - V_L \quad (3)$$

Assuming that the current at the sensing output node is very small ($V_{d}\approx 0$) and that the voltage $Vd_{in} = V_d$ the equation (2) can be rearranged:

$$V_{SENSE} = R(V_\phi V_d - V_L) \quad (4)$$

When the loop is closed, $V_{SENSE}$ is compared to a given reference voltage $V_{REF}$ based on $V_{BG}$. Therefore, $$V_\varphi - V_L - V_d = \frac{V_{REF}}{R} \quad (5)$$

Assuming $Vin = V_d$ the equation (5) can be substituted into equation (1) and assuming $Vin = V_d$ the following result is produced:

$$Vout = \frac{N}{R} V_{REF} \quad (6)$$

Equation (6) shows that the sensing charge-pump acts as a voltage divider, with a ratio given by the respective number of stages. Equation (6) does not depend on temperature, parasitic capacitance, load current or other external variables. Also note that the supply voltage $V_{IN}$ is usually given as large a voltage level as practical in order to reduce the number of stages N. Therefore, the supply voltage $V_{IN}$ is typically equal to a battery voltage that supplies power to a system that includes the charge pump 38.

FIG. 6 is a table of simulation results for the charge-pump 38 (FIG. 4). Parameters including temperature, load current $I_{LOAD}$, supply voltage $V_{dd}$, stray capacitance ratio alpha, and the output voltage $V_{OUT}$ are varied over several iterations of the simulation. The simulation assumes the output voltage $V_{OUT}$ is boosted to 120V from an input voltage $V_{dd}$ of 10V and a max load current Il≅1 µA. The simulation also assumes that the capacitors C1-$C_N$ (FIG. 5) each have a capacitance C of 0.7 pF. For the purposes of this disclosure alpha is defined as a ratio of stray capacitance $C_S$ of a single stage divided by the capacitance C of a single stage. The voltage gain $V_g$ per stage at f=2 MHz is $$Vg = Vdd - Vd - \frac{Il}{C \times f} = 8.5$$

The number of stage N is 120/8.5 e.g. N=14. Assuming the sensing charge pump 36 has two stages (i.e., R=2). A target voltage for $V_{SENSE}$ is set at $$Vout \frac{R}{N} = 120 \frac{2}{14} = 17 \text{ V}.$$

Figure 1:
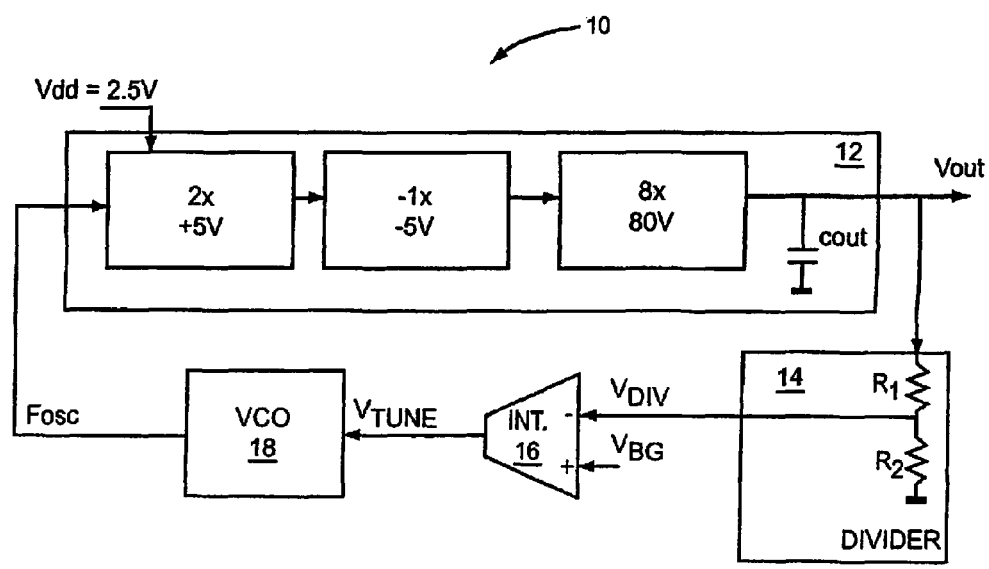
FIG. 1 is a block diagram of a prior art feedback loop controlled high voltage charge-pump.
Figure 2:
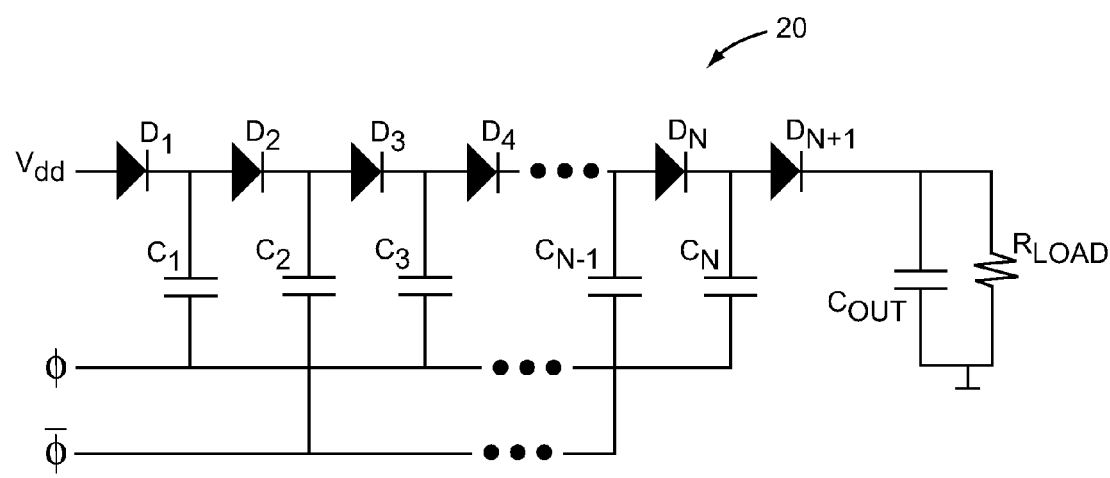
FIG. 2 is a circuit diagram of a prior art Dickson charge-pump that is usable as the high voltage charge-pump section of FIG. 1.

As can be seen in the table of FIG. 6, the output voltage stays within desirable voltage variation (125V+/−3V e.g. 2.5%) across the different parameter variations. This is comparable to the variation observed with a resistive divider such as the resistive divider load 12 (FIG. 1).

Figure 7:
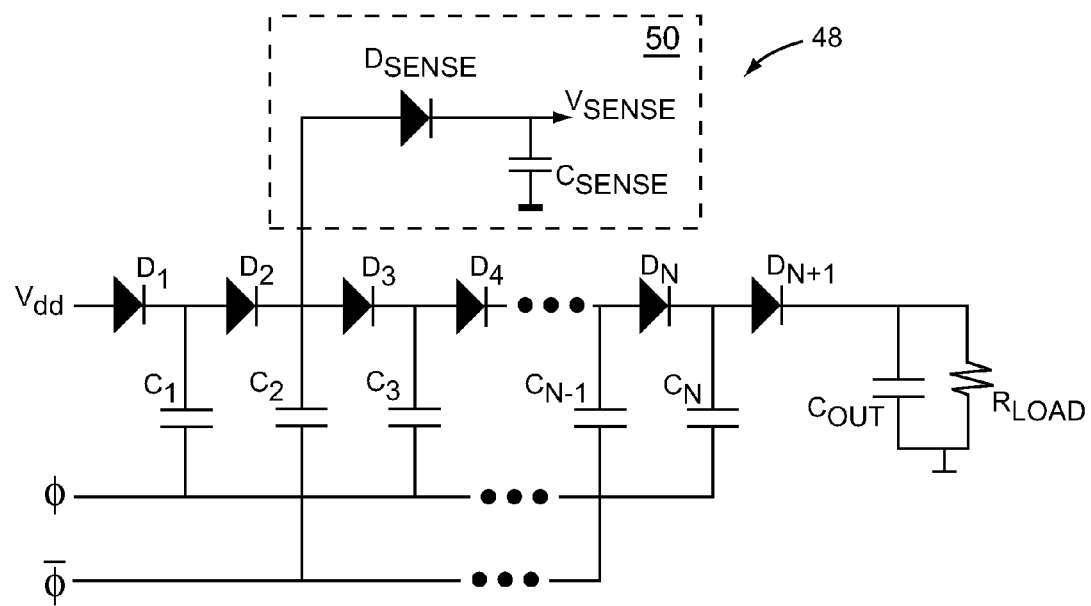
FIG. 7 is a circuit diagram of a Dickson charge-pump that is modified with a simplified sensing charge-pump in accordance with the present disclosure.

FIG. 7 is a circuit diagram of a Dickson charge-pump 48 that is modified with a simplified sensing charge-pump 50 in accordance with the present disclosure. The simplified sensing charge-pump 50 is made up of a sensing diode $D_{SENSE}$ and a sensing capacitor $C_{SENSE}$. The sensing diode $D_{SENSE}$ has an anode coupled to the cathode of the diode D2 making up a second stage of the simplified sensing charge-pump 50. The sensing diode $D_{SENSE}$ has a cathode that is coupled to a first end of the sensing capacitor $C_{SENSE}$. A second end of the sensing capacitor $C_{SENSE}$ is coupled to a fixed voltage node such as ground. A sensing voltage $V_{SENSE}$ is output from the cathode of the sensing diode $D_{SENSE}$.

Figure 8:
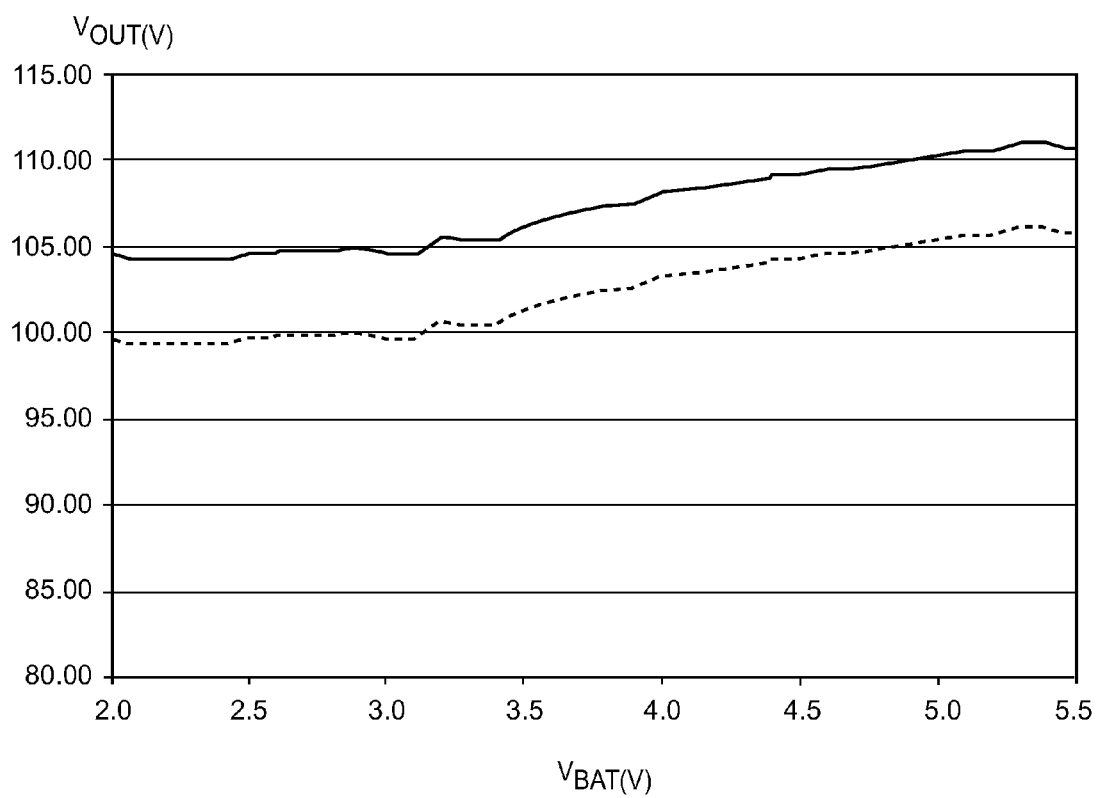
FIG. 8 is a graph with plots of output voltage versus Vdd for various battery voltages.

FIG. 8 is a graph with plots of output voltage versus $V_{dd}$ provided by various battery voltages. The Dickson charge-pump 48 (FIG. 7) when set for an output voltage of 95V yields an actual voltage measured of around 100V for battery voltages $V_{BAT}$ that are between about 2.0V and about 3.5V. Above 3.5V, the output voltage $V_{OUT}$ rises to around 105V for battery voltages $V_{BAT}$ between about 3.5V and 5.5V. Similarly, the Dickson charge-pump 48 when set for an output voltage of 100V yields an actual measured voltage of around 105V for battery voltages $V_{BAT}$ that are between about 2.0V and about 3.5V. Above 3.5V, the output voltage $V_{OUT}$ rises to around 110V for battery voltages $V_{BAT}$ between about 3.5V and 5.5V.

Figure 9:
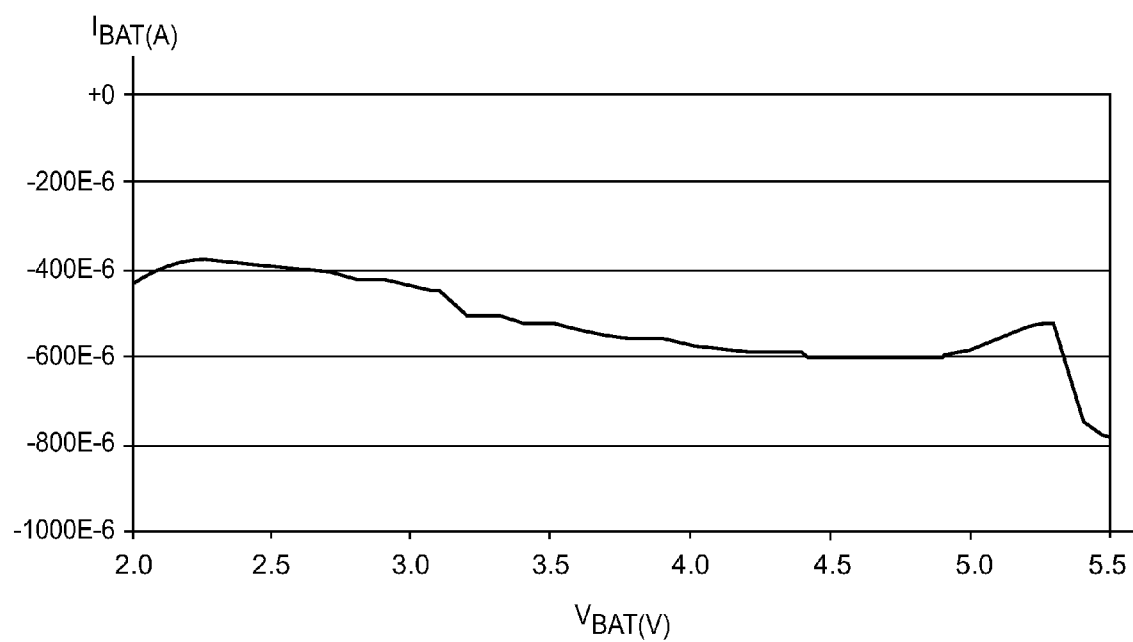
FIG. 9 is a graph having a plot of battery current versus battery voltage during operation of the Dickson charge-pump that is modified with a simplified sensing charge-pump of FIG. 7.

FIG. 9 is a graph having a plot of a battery current $I_{BAT}$ versus a battery voltage $V_{BAT}$ during operation of the Dickson charge-pump 48 that is modified with the simplified sensing charge-pump 50 (FIG. 7). The negative numbers assigned to the battery current $I_{BAT}$ indicates that current is being drawn from a battery sourcing the source voltage $V_{dd}$. A measured battery current $I_{BAT}$ is about 500 µA within the expected battery voltage $V_{BAT}$ range between about 3.2V and 3.7V. This represents a reduction by a factor of two in battery current $I_{BAT}$ drain in comparison with a typical battery current drain for a prior art charge-pump such as the prior art feedback loop controlled high voltage charge-pump 10 (FIG. 1).

FIG. 10 is a table that lists output voltage repeatability measurements over several samples. The table of FIG. 10 includes a column of sample numbers, a column of output voltages labeled V100 for the Dickson charge-pump 48 (FIG. 7) when set for an output voltage of 100V, a column of output voltages labeled V95 for the Dickson charge-pump 48 when set for an output voltage of 95V, and a column of reference band gap voltages $V_{BG}$.

Figure 11:
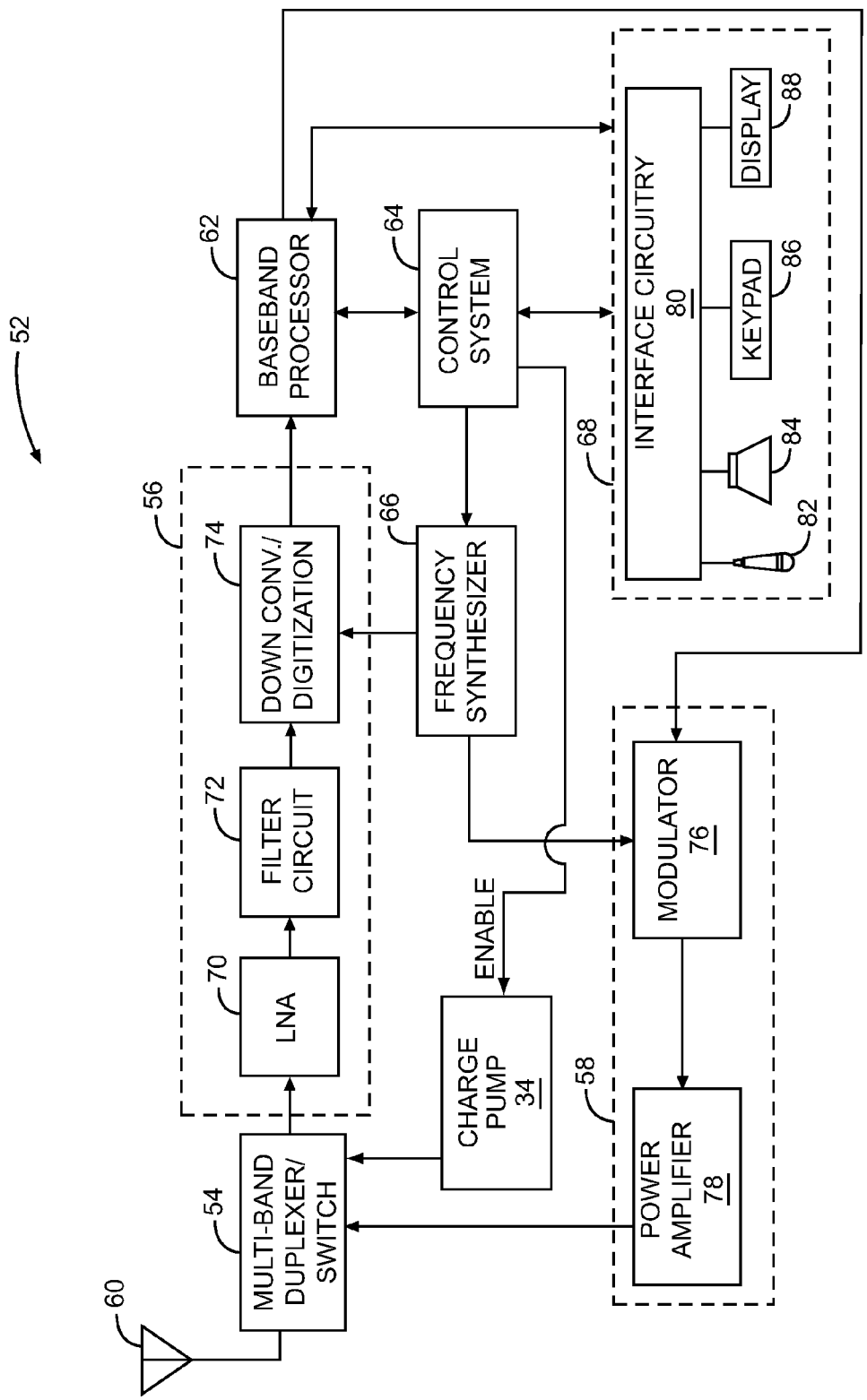
FIG. 11 is a block diagram of a mobile terminal that incorporates an embodiment of the feedback loop controlled high voltage charge-pump that is in accordance with the present disclosure.

FIG. 11 depicts the basic architecture of user equipment (UE) in the form of a mobile terminal 52 that incorporates an embodiment of the charge-pump 34 of FIG. 4. In particular, the charge-pump 34 is usable to activate a MEMS switch based duplexer or switch 54 in the mobile terminal 52. The mobile terminal 52 may include a receiver front end 56, a radio frequency (RF) transmitter section 58, an antenna 60, a baseband processor 62, a control system 64, a frequency synthesizer 66, and an interface 68. The receiver front end 56 receives information bearing radio frequency signals from one or more remote transmitters provided by a base station (not shown). A low noise amplifier (LNA) 70 amplifies the signal. A filter circuit 72 minimizes broadband interference in the received signal, while down conversion and digitization circuitry 74 down converts the filtered, received signal to an intermediate or baseband frequency signal, which is then digitized into one or more digital streams. The receiver front end 56 typically uses one or more mixing frequencies generated by the frequency synthesizer 66. The baseband processor 62 processes the digitized received signal to extract the information or data bits conveyed in the received signal. This processing typically comprises demodulation, decoding, and error correction operations. As such, the baseband processor 62 is generally implemented in one or more digital signal processors (DSPs).

On the transmit side, the baseband processor 62 receives digitized data, which may represent voice, data, or control information, from the control system 64, which it encodes for transmission. The encoded data is output to the RF transmitter section 58, where it is used by a modulator 76 to modulate a carrier signal that is at a desired transmit frequency. A power amplifier circuitry 78 amplifies the modulated carrier signal to a level appropriate for transmission, and delivers the amplified and modulated carrier signal to the antenna 60 through the duplexer or switch 54. The control system 64 controls an ENABLE signal that activates and deactivates the charge-pump 34 as needed. For example, the control system 64 may activate the charge-pump 34 in anticipation of closing a MEMS switch (not shown) or other device for a transmission event. Alternately, the control system 64 may deactivate the charge-pump 34 to conserve energy.

A user may interact with the mobile terminal 52 via the interface 68, which may include interface circuitry 80 associated with a microphone 82, a speaker 84, a keypad 86, and a display 88. The interface circuitry 80 typically includes analog-to-digital converters, digital-to-analog converters, amplifiers, and the like. Additionally, it may include a voice encoder/decoder, in which case it may communicate directly with the baseband processor 62. The microphone 82 will typically convert audio input, such as the user's voice, into an electrical signal, which is then digitized and passed directly or indirectly to the baseband processor 62. Audio information encoded in the received signal is recovered by the baseband processor 62, and converted by the interface circuitry 80 into an analog signal suitable for driving the speaker 84. The keypad 86 and the display 88 enable the user to interact with the mobile terminal 52, input numbers to be dialed, address book information, or the like, as well as monitor call progress information.

Those skilled in the art will recognize improvements and modifications to the preferred embodiments of the present disclosure. All such improvements and modifications are considered within the scope of the concepts disclosed herein and the claims that follow.

What is claimed is:

1. A charge-pump circuit comprising:
   a charge-pump section having a low voltage input, at least one clock input and a high voltage output, the charge-pump section including a plurality of voltage boosting stages;
   a sensing charge-pump having a voltage detector output, the sensing charge-pump including a voltage sensing stage, the voltage sensing stage communicably coupled to at least one of the plurality of voltage boosting stages and adapted to selectively charge and discharge at least one capacitor from a voltage present at the coupled at least one of the plurality of voltage boosting stages to produce a sensing voltage; and
   a voltage controlled oscillator (VCO) in communication with the voltage detector output and the at least one clock input and adapted to vary the frequency of a clock signal delivered to the at least one clock input based upon the voltage detector output.

2. The charge-pump circuit of claim 1, wherein the charge-pump section has a Dickson type charge-pump topology.

3. The charge-pump circuit of claim 1, wherein the voltage sensing stage comprises a diode having an anode coupled to one of the plurality of voltage boosting stages and a cathode coupled to the at least one capacitor having a first end that is usable as the voltage detector output and a second end that is coupled to a fixed voltage node.

4. The charge-pump circuit of claim 3, wherein the fixed voltage node is a ground node.

5. The charge-pump circuit of claim 1, wherein the charge-pump circuit is adapted to receive an enable signal for activating and deactivating the charge-pump circuit.

6. A charge-pump circuit comprising:
   a charge-pump section having a low voltage input, at least one clock input and a high voltage output, the charge-pump section including a plurality of voltage boosting stages; and
   a sensing charge-pump having a voltage detector output, the sensing charge-pump including at least one voltage sensing stage communicably coupled to at least one of the plurality of voltage boosting stages;
   a loop filter having a voltage detector input coupled to the voltage detector output, a voltage reference input, and a voltage error output;
   a voltage controlled oscillator (VCO) having a voltage error input coupled to the voltage error output and a variable frequency output; and
   at least one driver having a variable frequency input coupled to the variable frequency output and at least one clock output coupled to the at least one clock input of the charge-pump section.

7. The charge-pump circuit of claim 6, wherein a band gap voltage reference is coupled to the voltage reference input of the loop filter.

8. The charge-pump circuit of claim 6, wherein the loop filter is an integrator type loop filter.

9. A mobile terminal comprising:
   an antenna;
   a micro-electro-mechanical systems (MEMS) switch coupled to the antenna;
   a charge-pump circuit having a high voltage output for activating the MEMS switch, the charge pump circuit comprising:
      a charge-pump section having a low voltage input, at least one clock input and the high voltage output, and a plurality of voltage boosting stages; and
      a sensing charge-pump having a voltage sensing output, the sensing charge-pump including at least one voltage sensing stage communicably coupled to at least one of the plurality of voltage boosting stages, and
   a control system for enabling and disabling the charge pump circuit.

10. The mobile terminal of claim 9, wherein the charge-pump circuit further includes:
   a loop filter having a voltage detector input coupled to the voltage sensing output, a voltage reference input, and a voltage error output;
   a voltage controlled oscillator (VCO) having a voltage error input coupled to the voltage error output and a variable frequency output; and
   at least one driver having a variable frequency input coupled to the variable frequency output and at least one clock output coupled to the at least one clock input of the charge-pump section.

11. The mobile terminal of claim 10, wherein a band gap voltage reference is coupled to the voltage reference input of the loop filter.

12. The mobile terminal of claim 10, wherein the loop filter is an integrator type loop filter.

13. The mobile terminal of claim 9, wherein the charge-pump section has a Dickson type charge-pump topology.

14. The mobile terminal of claim 9, wherein the at least one voltage sensing stage comprises a diode having an anode coupled to one of the plurality of voltage boosting stages and a cathode coupled to a holding capacitor having a first end that is usable as the voltage sensing output and a second end that is coupled to a fixed voltage node.

15. The mobile terminal of claim 14, wherein the fixed voltage node is a ground node.

16. A charge-pump circuit comprising:
    a charge-pump section having a low voltage input, at least one clock input and a high voltage output, the charge-pump section including a plurality of voltage boosting stages;
    a sensing charge-pump having a voltage detector output, the sensing charge-pump including at least one voltage sensing stage communicably coupled to at least one of the plurality of voltage boosting stages; and
    a feedback loop comprising:
        a loop filter having a voltage detector input coupled to the voltage detector output, a voltage reference input, and a voltage error output;
        a voltage controlled oscillator (VCO) having a voltage error input coupled to the voltage error output and a variable frequency output; and
        at least one driver having a variable frequency input coupled to the variable frequency output and at least one clock output coupled to the at least one clock input of the charge-pump section.

17. The charge-pump circuit of claim 16, wherein a band gap voltage reference is coupled to the voltage reference input of the loop filter.

18. The charge-pump circuit of claim 16, wherein the loop filter is an integrator type loop filter.

19. The charge-pump circuit of claim 16, wherein the charge-pump section is a Dickson charge-pump.

20. The charge-pump circuit of claim 16, wherein the charge-pump circuit is adapted to be activated and deactivated by an enable signal.

\* \* \* \* \*